Nov. 22, 1960 W. A. GEYGER 2,961,599

MAGNETIC AMPLIFIER CIRCUIT OF THE BIAS-EXCITATION TYPE

Filed Aug. 28, 1957 5 Sheets-Sheet 1

INVENTOR.
W. A. GEYGER

BY

ATTORNEYS.

Nov. 22, 1960 W. A. GEYGER 2,961,599

MAGNETIC AMPLIFIER CIRCUIT OF THE BIAS-EXCITATION TYPE

Filed Aug. 28, 1957 5 Sheets-Sheet 2

INVENTOR.
W. A. GEYGER

BY

ATTORNEYS.

Nov. 22, 1960 W. A. GEYGER 2,961,599

MAGNETIC AMPLIFIER CIRCUIT OF THE BIAS-EXCITATION TYPE

Filed Aug. 28, 1957 5 Sheets-Sheet 3

INVENTOR.
W. A. GEYGER

BY

ATTORNEYS.

INVENTOR
W. A. GEYGER

BY
ATTORNEYS

INVENTOR.
W. A. GEYGER

BY

ATTORNEYS.

United States Patent Office 2,961,599

Patented Nov. 22, 1960

2,961,599

MAGNETIC AMPLIFIER CIRCUIT OF THE BIAS-EXCITATION TYPE

William A. Geyger, Takoma Park, Md., assignor to the United States of America as represented by the Secretary of the Navy Filed Aug. 28, 1957, Ser. No. 680,897

17 Claims. (Cl. 323—89)

(Granted under Title 35, U.S. Code (1952), sec. 266)

The invention described herein may be manufactured and used by or for the Government of the United States of America for governmental purposes without the payment of any royalties thereon or therefor.

The present invention relates generally to push-pull magnetic amplifier circuits of the bias excitation type, and more particularly pertains to new and improved push-pull bias-excitation type of magnetic amplifier arrangements in which the inherent drift error is minimized to thereby enhance the use thereof with high-performance instrument-type servos for remote positioning applications. For attaining this objective, the invention is based upon the use of a novel output coupling circuit in a push-pull magnetic amplifier stage of the bias-excitation type. The novel configuration of the output coupling circuit of the present invention, which circuit in essence is a polarity-discriminating half-cycle splitting circuit, results in the utilization of less rectifier components than heretofore required in circuit arrangements of this type and thereby decreases the factors which contribute to the presence of inherent drift error in the amplifier system. In addition, the output coupling circuit of the present invention makes feasible the combination of bias-excitation magnetic amplifiers with self-saturated magnetic amplifiers so that the advantages of each can be utilized.

Due to lack of technological advancements in the development of other types of magnetic amplifier circuits, self-saturating types of magnetic amplifiers, which are characterized by high gain and high speed of response, have been predominantly employed in high-performance instrument type servos for remote positioning applications. Notwithstanding the desirable gain and speed of response characteristics displayed by self-saturated circuits, these types of circuits are characterized by a high degree of instability which leaves much to be desired in the performance thereof in servo applications.

As is well known to those skilled in the art, the flow of quiescent currents in self-saturated types of magnetic amplifier circuits is a normal operating condition; and, if the quiescent currents were constant, they could be compensated so as not to deleteriously affect the output of the amplifier. However, actual magnitude of the quiescent current of a self-saturated, or self-excited, circuit is highly dependent upon changes in amplitude and frequency of the power supply voltage, changes in temperature conditions, which affect the reactors and rectifiers and dissimilarity of the magnetic amplifier components. From these factors, it is readily appreciated that quiescent currents in self-salurated circuits are not of an unvarying nature but, indeed, vary in an unpredictable manner to introduce undesirable and uncontrollable current influencing effects which render self-saturating circuits inherently unstable. In contrast to the quiescent current conditions of self-saturating circuits, the quiescent currents in magnetic amplifiers of the bias-excitation type generally are independent of changes in power supply and are more stable than self-saturating circuits, as will be more apparent from the analytical comparison hereinafter presented.

Since the ideal conditions most generally desired in magnetic amplifier arrangements are high gain, speed of response and stability, it can be readily appreciated by those skilled in the art that a magnetic amplifier arrangement which combines the stable character of a bias-excitation circuit with the gain and speed of response of self-saturating circuits is highly advantageous and would fulfill the most generally desired features in magnetic amplifiers. The present invention proposes innovations in push-pull bias-excitation types of magnetic amplifiers which make possible the combination of push-pull bias-excitation magnetic amplifiers with self-saturating magnetic amplifiers.

In multi-stage push-pull magnetic amplifiers heretofore proposed for servo applications, the input stage generally was of the self-saturating push-pull type. In accordance with several forms of the present invention, a push-pull magnetic amplifier of the bias-excitation type is employed as the input stage of a multi-stage magnetic amplifier arrangement in which the subsequent stages are of the self-saturating type, the novel output coupling circuit of the bias excitation input stage enabling the feasibility of combining bias-excitation circuitry with self-saturating circuitry. In one embodiment, the bias-excitation input stage is connected to supply two separate half-wave self-saturating output stages which may feed a common load such, for example, as the common control windings of a two-phase squirrel-cage reversible motor or two separate A.C. or D.C. load devices. In another form, the aforedescribed embodiment may be so connected that one of the output stages contains, or is, a dummy load whereas the other output stage is of the half-wave self-saturating type connected to deliver half-cycle current pulses to a utilization device whereby the multi-stage system operates as a half-wave output amplifier from a full-wave input. Still another form of the invention utilizes differentially wound control windings on the self-saturating half-wave stages, the control windings serving as the load impedances of the input bias-excitation stage. In a basic concept of the invention, a new and improved single-stage push-pull magnetic amplifier of the bias-excitation type is employed to drive D.C. instruments of the moving coil type, such as ink recorders, or small integrating motors. In order to adapt this basic concept for heavier load applications, the present invention provides a modification thereof incorporating the combination of positive differential feedback with a self-balancing feedback circuit.

In addition to make feasible the combination of bias-excitation circuitry with self-saturating circuitry, the present invention provides a new and improved push-pull magnetic amplifier of the bias excitation type having a novel output circuit which requires relatively few components with a consequent reduction in drift error.

Magnetic amplifiers of the push-pull type consist, ordinarily, of two symmetrically built sections which respond in opposite sense to an input signal, the output of one section increasing while that of the other section is decreasing. Theoretically, under zero signal conditions, the outputs of both sections are substantially equal but opposite to each other so that the net average useful output in the load is zero. In principle, push-pull magnetic amplifiers include saturable core reactors and dry-disk rectifiers, and require the fulfillment of a balance condition which must be mostly independent of changes in magnitude and frequency of power supply voltage, changes in ambient temperature, changes resulting from aging of the components, and dissimilarity in the characteristics of the components.

Obviously, with perfect symmetry concerning performance characteristics of the saturable reactor and rectifier components, this balance condition will be fulfilled, even when such changes occur. However, in practice, and as is well recognized by those skilled in this particular field, some deviations from perfect symmetry will always exist, because saturable reactor and dry-disk rectifier characteristics will never be perfectly identical. This is due to the fact that, as a consequence of the numerous rectifiers and core reactors employed in conventional magnetic amplifier circuits, the matching procedures of the rectifiers and reactors involve such complex factors as to make perfect matching of the components so highly improbable as to be practically impossible.

Therefore, with zero input, a certain comparatively small output, corresponding to the actual amount of asymmetry inherently present within the system due to mis-matching, will be produced. This output represents the drift error inherently present in the amplifier and, in order to obtain optimum operation of the amplifier, must be as small as possible. Indeed, for many applications of push-pull type magnetic amplifiers, particularly those in the fields of instrumentation, automatic control, and high-performance servo mechanisms, achievement of an extremely small drift error is of paramount importance.

The general purpose of this invention is to provide a new and improved push-pull bias-excitation type of magnetic amplifier in which the inherent drift error is minimized and which readily lends itself for servo applications in combination with self-saturating magnetic amplifiers so that the advantages of each can be effectively utilized.

The present invention contemplates the provision, in a push-pull magnetic amplifier of the bias-excitation type, of a novel output coupling circuit which makes it possible to reduce materially the well-known practical difficulties encountered in the matching procedure on dry-disk rectifier components. To attain this end, the invention employs a first pair of similarly poled rectifiers serially connecting the load windings across the A.C. operating source of the amplifier and phased to pass current in one direction through the load windings, a second pair of similarly poled rectifiers serially connecting the same load windings across the aforesaid source and phased to pass current in the opposite direction through the load windings, and a pair of auxiliary load impedances individually responsive on successive half-cycles of the A.C. source to the resultant current output during their respective responsive half-cycles. In this manner, it is possible to employ four rectifiers in bias-excitation types of magnetic amplifiers whereas, heretofore, eight such rectifiers were required.

In accordance with the operation of the invention, a pair of polarity discriminating circuits, defined by the circuitry of the aforedescribed first and second pairs of rectifiers with the common load windings, are operable to pass predetermined alternate half-cycles of an A.C. operating source in one direction through the load windings and to pass the other alternate half-cycles in the opposite direction through the same load windings, each discriminating circuit presenting two conductive paths of unequal impedances under control signal conditions during its respective conductive half-cycle, whereby the current appearing across a load impedance individual to each of the pairs of discriminating circuits is the difference of the currents flowing in the paths of each pair.

An important object of this invention is to provide a new and improved push-pull magnetic amplifier of the bias-excitation type.

Another object is to provide a push-pull bias-excitation type of magnetic amplifier in which the inherent drift error is at a minimum to thereby enhance the use thereof in high-performance instrument type servos for remote positioning applications.

It is another object of this invention to reduce the practical difficulties encountered in the matching procedure of dry-disk rectifier components in push-pull magnetic ampifiers of the bias-excitation type.

A further object is to provide an output circuit arrangement for push-pull bias-excitation type of magnetic amplifiers wherein the number of dry-disk rectifiers utilized is reduced with resultant improved output coupling conditions.

Another important object of the invention is to replace the conventionally employed self-saturating input stage of magnetic servo systems with a push-pull bias-excitation type of magnetic amplifier characterized by a novel output coupling circuit which makes such replacement possible.

Yet another object of this invention is to combine bias-excitation type push-pull arrangements with half-wave self-saturating circuits in a two-stage design in such a manner that low-drift properties of the magnetic servo system will be obtained.

A still further object is the provision of a novel multi-stage magnetic amplifier arangement in which a push-pull bias-excitation magnetic amplifier circuit, serving as the input stage, is coupled through a novel output coupling circuit to half-wave self-saturating output-stage circuits.

A significant object is to provide a new and improved push-pull bias-excitation type of magnetic amplifier which is adapable to produce either a full-wave output signal or a half-wave output signal from a full-wave input control signal.

Another object resides in the provision of a versatile push-pull bias-excitation type of magnetic amplifier which is capable of operating from either a full-wave polarity-reversible D.C. control signal or from a full-wave modulated A.C. control signal to produce either a uni-direction full-wave or half-wave output signal which is correlative in phase sense and magnitude to the phase sense and magnitude of the input control signal.

Still another object is to provide a push-pull bias-excitation magnetic amplifier characterized by a novel output coupling circuit and further incorporating differential feedback windings to increase the gain thereof.

An essential object of the present invention is the provision of a push-pull bias-excitation magnetic amplifier employing a novel output coupling circuit which is supplemented by differential feedback windings and by self-balancing circuitry interconnecting the output of the bias-excitation amplifier with the control windings thereof.

A further object is to combine a novel low-drift bias-excitation type of magnetic amplifier with self-saturating circuitry characterized by differentially wound control windings.

A still further object of the invention is to provide a novel output circuit for coupling a bias excitation type input-stage circuit with half-wave self-saturating output-stage circuits connected to control a two-phase motor.

A more specific object is to provide a multi-stage magnetic amplifier arrangement which combines a low-drift input-stage circuit with half-wave output-stage circuits having fast speed of response.

Another specific object is the utilization of novel polarity-discriminating half-cycle splitting circuit as the output circuit of a bias-excitation type push-pull input stage for effectively coupling the input stage with one or two half-wave self-saturating output stages whereby low-drift properties are obtained in a high-speed magnetic servo amplifier.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the following detailed description in conjunction with the accompanying drawings in which like reference characters designate like parts throughout the several figures thereof and wherein:

Figure 1:
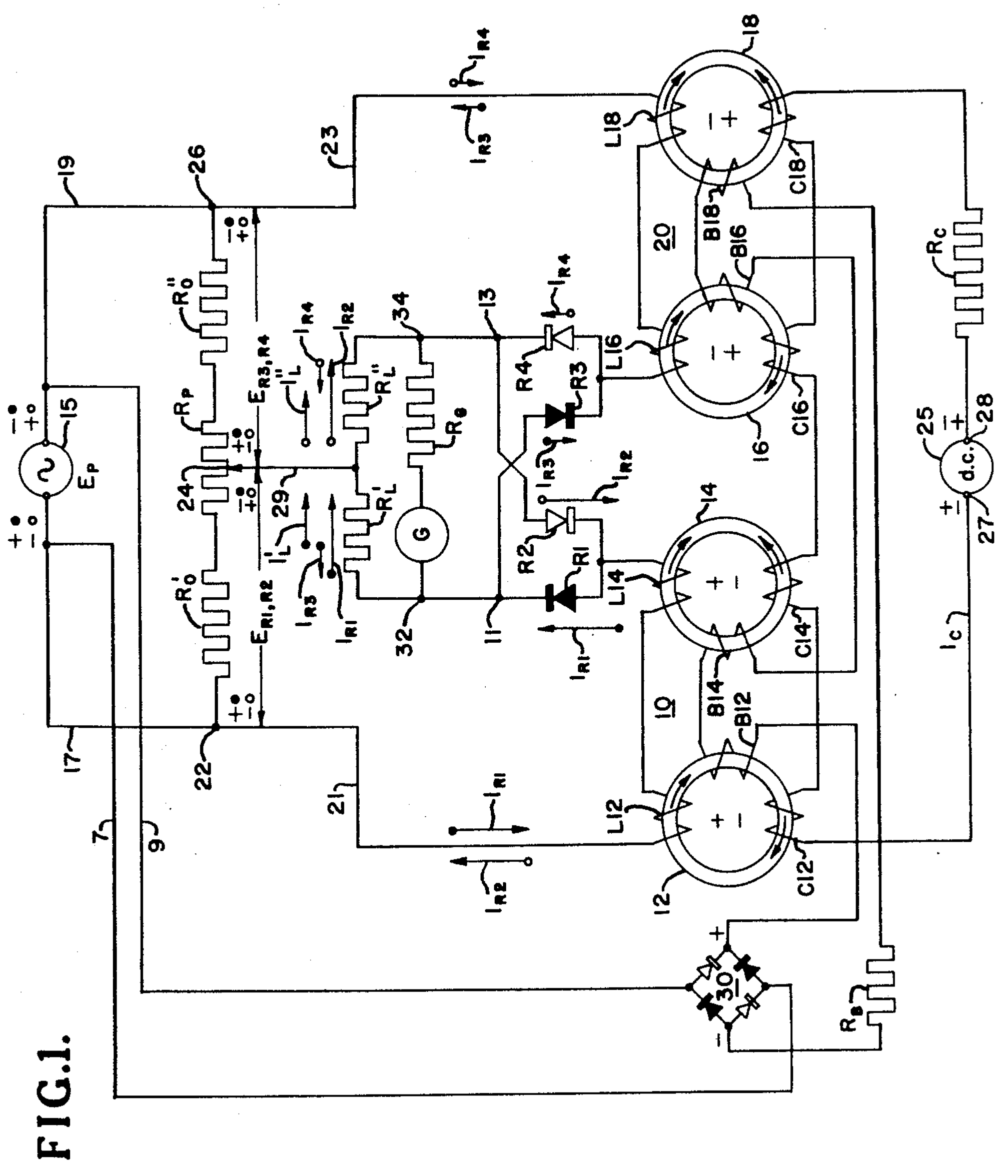
Fig. 1 is a schematic diagram of a single-stage push-pull magnetic amplifier of the bias-execitation type operating from a D.C. control signal and utilizing a polarity-discriminating half-cycle splitting output circuit arranged in accordance with the basic concept of the invention.

Figs. 5(*a*) and 5(*b*) illustrate the ideal transfer characteristic and the actual transfer characcteristic, respectively, of conventional single-ended self-excited magnetic amplifier circuit utilizing either external or internal feedback;

Fig. 5(*c*) represents the duo-directional transfer characteristic of a conventional push-pull self-saturating circuit; and Fig. 5(*d*) is a graphical presentation illustrating the fundamental mode of operation of a bias-excitation type push-pull circuit.

A discussion of the transfer characteristics of self-saturating and bias-excitation systems is now presented with reference to Figs. 5(*a*) to 5(*d*) in order to more clearly illustrate the advantages in stability which bias-excitation circuits inherently possess over self-saturating circuits. The characteristic of Fig. 5(*a*), which illustrates the ideal transfer characteristic of conventional single-ended self-excited magnetic amplifiers utilizing either external or internal feedback, represents the ampere-turns $I_LN_L$ of the output load circuit as a function of the ampere-turns $I_CN_C$ of the input control circuit of the magnetic amplifier. Under no-signal conditions ($I_C=0$), the load current $I_L$ has a certain value which is called the "quiescent current value" or "Q-current," because it corresponds to the "quiescent point Q" of a three-element vacuum tube.

When using external-feedback circuits with saturable-reactor elements having rectangular hysteresis-loop core material, the theoretical feedback factor F is given by the ratio of feedback ampere-turns $I_LN_F$ to load ampere-turns $I_LN_L$, or may be represented by the generalized equation, $$F=K\frac{N_F}{N_L}$$

where K is a constant. Actual value of quiescent current $I_Q$ is dependent upon the size of the cores, magnetic properties of the core material, magnitude and frequency of the applied power supply voltage, turns ratio $N_F/N_L$, and departure of the feedback rectifier elements from the ideal characteristic. From this, it is quite apparent that, in self-saturating circuits, many inherent factors exist which may delteriously affect the quiescent current value and render self-saturating circuits inherently unstable. In addition to the instability caused directly by mis-matched components and characteristic variations thereof due to environmental conditions, further instability is introduced by the adverse effects of the mis-matched components on the feedback circuits. With $N_F=N_L$, the the external-feedback and internal feedback circuits, while still operable to perform their respective functions, will have poor stability if the components are mis-matched or vary unequally under changing environmental conditions.

Fig. 5(*b*) illustrates the fact that, in self-excited circuitry, the actual value of quiescent current deviates from its stable $I_Q$ value and varies within certain limits which are indicated by the boundary values $I_Q'$ (minimum value) and $I_Q''$ (maximum value). It is therefore quite evident that actual magnitude of the quiescent current of a self-excited circuit utilizing either external or internal feedback will be highly dependent on changes in magnitude and frequency of power supply voltage and changes in ambient temperature, which affect the characteristic impedances of the saturable reactors and dry-disk rectifiers of the magnetic amplifier circuit.

Fig. 5(*c*), which is a duo-directional transfer characteristic $I_L=I_{L_1}-I_{L_2}$, illustrates the practical consequences of such changes of quiescent current upon conventional self-saturating push-pull circuits. It shows clearly that, in such a self-saturated circuit, the cross-over point on the axis wanders; and, when using two self-saturated circuits back-to-back, it is necessary to match their characteristics over a large part of the working range.

Referring now to Fig. 5(*d*) wherein is illustrated the fundamental mode of operation of a bias-excitation type of push-pull circuit, having two symmetrical sections operatively responsive in opposite sense, this graphical presentation shows the two load current components, $I_{L1}$ and $I_{L2}$, of the two symmetrical sections as a function of power supply voltage $E_P$ with the reversible input signal, or control, current $I_C$ as a parameter. During operation, the two sections of the bias-excitation push-pull circuit develop a respective quiescent current component, the developed quiescent currents being in phase opposition as illustrated by $I_{Q1}$ and $I_{Q2}$ for zero control current condition. Moreover, since the two developed quiescent currents, as exemplified by $I_{Q1}$ and $I_{Q2}$, are proportional to the common external D.C. bias current and substantially independent of changes in magnitude and frequency of power supply voltage $E_P$ and also substantially independent of changes in load resistances (actual copper resistances of the load windings, forward resistances of the dry-disk rectifier elements, etc.), the magnitude of the quiescent currents of the two sections will vary substantially at the same rate with changes in operating conditions.

Therefore, since the developed pair of quiescent currents in bias-excitation circuits are opposite in sense and substantially equal in magnitude throughout the operating range, the quiescent currents substantially nullify each other, thereby resulting in insignificant or no quiescent current flow. This is an important and advantageous characteristic of bias-excitation circuits when one considers that the quiescent current flow in self-excited circuits is continuously varying. Moreover, due to the fact that the quiescent currents in bias-excitation circuits are substantially independent of changes in power supply magnitude and frequency and of changes in load resistances, influences in ambient temperature changes upon the saturable reactors and dry-disk rectifiers become second-order effects, which is in contrast to the characteristics of self-excited circuits wherein the quiescent currents are directly dependent upon such factors.

From the foregoing comparative analysis of the respective characteristics of bias-excitation magnetic circuits and self-excited magnetic circuits, it is manifestly evident that bias-excitation push-pull magnetic circuits inherently possess greater stability than self-excited, or self-saturating, magnetic circuits. Notwithstanding this inherent advantage of bias-excitation magnetic circuitry, the present invention provides a novel bias-excitation push-pull magnetic amplifier circuit which has improved stability over conventional bias-excitation type of push-pull magnetic amplifier circuits and which is capable of utilization in combination with self-saturating magnetic amplifier, as will hereinafter become more apparent from the specific description of the several forms of the invention.

Referring now to the schematic circuits, wherein like reference characters designate like or corresponding parts throughout the several figures, there is shown in Fig. 1, which illustrates the basic concept of utilizing a polarity-discriminating half-cycle splitting output circuit in accordance with the teachings of the present invention, a single-stage push-pull full-wave magnetic amplifier of the bias-excitation type operating from a polarity-reversible D.C. control signal source 25 and having a pair of equally rated saturable reactor sections, indicated generally at 10 and 20. Sections 10 and 20 operate into resistive auxiliary load $R_L'$ on alternate half-cycles of source $E_P$ and into resistive auxiliary load $R_L''$ on the other alternate half-cycles of source $E_P$, the useful full-wave output appearing across terminals 32—34 for application to a D.C. utilization device G of the moving coil type such, for example, as a galvanometer-movement motor or small integrating motor. In this manner, sections 10 and 20 are operable on one half-cycle of source 15 to present opposing load current components $I_{R_1}$ and $I_{R_3}$ across auxiliary resistive load $R_L'$ with the resultant useful load current $I_L'$ being the difference therebetween, and operable on the other half-cycle to provide opposing load current components $I_{R_2}$ and $I_{R_4}$ across resistive load $R_L''$, the useful difference load current being $I_L''$.

Reactor section 10 consists of a pair of core reactors 12 and 14 having wound thereon control windings C12 and C14 respectively, A.C. load windings L12 and L14 respectively, and full-wave D.C. bias windings B12 and B14 respectively. The load windings L12 and L14 are connected in series-aiding relation to generate, in cores 12 and 14, magnetomotive forces having the same direction of D.C. magnetization, as shown by the arrowed lines adjacent windings L12 and L14; and, the control windings C12 and C14 are connected in series-opposing relation so as to produce D.C. magnetizations which differentially vary the flux levels of cores 12 and 14, as indicated by the arrowed lines adjacent windings C12 and C14.

The reactor section 20 consists of a pair of reactor cores 16 and 18 having wound thereon series-aiding-connected load windings L16 and L18 respectively, series-opposing-connected control windings C16 and C18 respectively, and full-wave D.C. bias windings B16 and B18 respectively, the control and load windings being relatively disposed as aforedescribed for reactor section 10. As is conventional, cores 12, 14, 16 and 18 are formed of saturable magnetic material preferably having rectangular hysteresis-loop characteristics.

Control is provided for the saturable-reactor sections 10 and 20 from a polarity-reversible D.C. current source 25, such for example as a phase-sensitive rectifier, source 25 being connected in closed series circuit relationhip with control windings C12 and C18 through current 25 being connected in closed series circuit relationship limiting resistor $R_C$ whereby the same control current $I_C$ flows through all the control windings. Thus, for a given polarity of the D.C. control signal current $I_C$, the ampere turns of the control windings will differentially vary, in a correlative sense, the impedances of the reactors in sections 10 and 20 during each half-cycle of A.C. source 15 to thereby provide incremental control flux. Reference flux level for sections 10 and 20 is established through bias windings B12 and B18 which are serially connected, through resistor $R_B$, across the output terminals of full-wave bridge rectifier 30 to which is applied alternating current from A.C. source 15 by way of leads 7 and 9.

The two saturable-reactor systems 10 and 20 (the "plus-minus system" and the "minus-plus system") are energized with equal A.C. voltages during each half-cycle ($E_{R_1}$ and $E_{R_3}$ during alternate half-cycles when terminal 22 is positive; $E_{R_2}$ and $E_{R_4}$ during alternate half-cycles when terminal 26 is positive) of A.C. power supply source 15 through a voltage divider network consisting of resistors $R_0'$, $R_0''$ and balancing potentiometers $R_P$ which permits adjustment such that $E_{R_1}=E_{R_3}$ and $E_{R_2}=E_{R_4}$. During the half-cycles that terminal 22 is positive, voltage $E_{R_1}$ is impressed across terminals 22—24 of a first branch circuit including in series the windings L12, L14, rectifier R1, and auxiliary resistive load $R_L$ to introduce therein unidirectional current component $I_{R_1}$; and voltage $E_{R_3}$ is applied across terminals 24—26 of a second branch circuit including in series resistive load $R_L'$, rectifier R3 via lead 11, and windings L16, L18 to introduce therein unidirectional current component $I_{R_3}$. The aforedescribed first and second branch circuits define a polarity discriminating circuit which is operable during its prescribed alternate half-cycles to provide a useful output current $I_L'$ which is the difference of current components $I_{R_1}$ and $I_{R_3}$.

During the negative half-cycles (when terminal 26 is positive) of source 15, the equal voltages $E_{R_4}$ and $E_{R_2}$ are effective to introduce opposing current components $I_{R_4}$ and $I_{R_2}$ across resistor $R_L''$ to derive the difference output current $I''_L$. The conductive branch for current component $I_{R_4}$ is from terminal 26 to windings L18 and L16 via lead 23, rectifier R4 and resistive load $R_L''$; and, the conductive branch for current component $I_{R_2}$ is from terminal 24 through auxiliary load $R_L''$ to rectifier R2 by way of lead 13 and through windings L14 and L12, the two conductive branches defining a second polarity discriminating circuit which is operable during its prescribed alternate half-cycles to provide a useful output current $I_L''$ which is the difference of current components $I_{R_2}$ and $I_{R_4}$. Thus, it is seen that the invention provides a pair of polarity discriminating circuits which are individually conductive on opposing half-cycles of an A.C. source and each of which includes two conductive branches for its respective conductive half-cycle, the load windings L12 to L18 being common to the pair of polarity discriminating circuits.

The graphical symbols of Fig. 1, which are presented in such a manner as to facilitate the comprehension of the overall actual mode of operation of the magnetic amplifier circuit, show that the black rectifiers are conducting simultaneously during the first half-cycle (black polarities) of power supply voltage $E_P$ to derive half-wave current components $I_{R_1}$ and $I_{R_3}$ while the white rectifiers conduct simultaneously during the second half-cycle period of $E_P$ (white polarities) to derive half-wave current components $I_{R_2}$ and $I_{R_4}$. Hence, auxiliary resistive load $R'_L$ carries the first half-cycle reversible output current $I_L'=I_{R1}-I_{R3}$, whereas auxiliary resistive load $R_L''$ carries the second half-cycle reversible output current $I_L''=I_{R_2}-I_{R_4}$, as illustrated by the arrowed-lines representing the current components. As is understood by those skilled in the art, a D.C. control signal current of one polarity causes current components $I_{R_1}$ and $I_{R_2}$ to increase and current components $I_{R_3}$ and $I_{R_4}$ to decrease; and, vice-versa for a control signal of opposite polarity. In the arrangement of Fig. 1, the lengths of the arrowed-lines represent the magnitude of their respective half-wave current components and, as illustrated, are based upon the assumption that the polarity-reversible D.C. control signal applied across terminals 27 and 28 from source 25 presents a signal which is positive at terminal 27.

It is to be noted that output currents $I_L'$ and $I_L''$ have the same direction of current flow and therefore present, across terminals 32—34, a composite full-wave unidirectional output current, of which the polarity and magnitude are correlative with the direction and amplitude of the input control signal from source 25. This composite full-wave current is utilized to drive a moving coil type of D.C. instrument, indicated generally as G. Due to the fact that the highly stable circuit of Fig. 1 has a low power amplification factor, it is exceptionally suited for application in D.C. instrumentation but is not suitable for servo applications which require a higher gain output.

Figure 2:
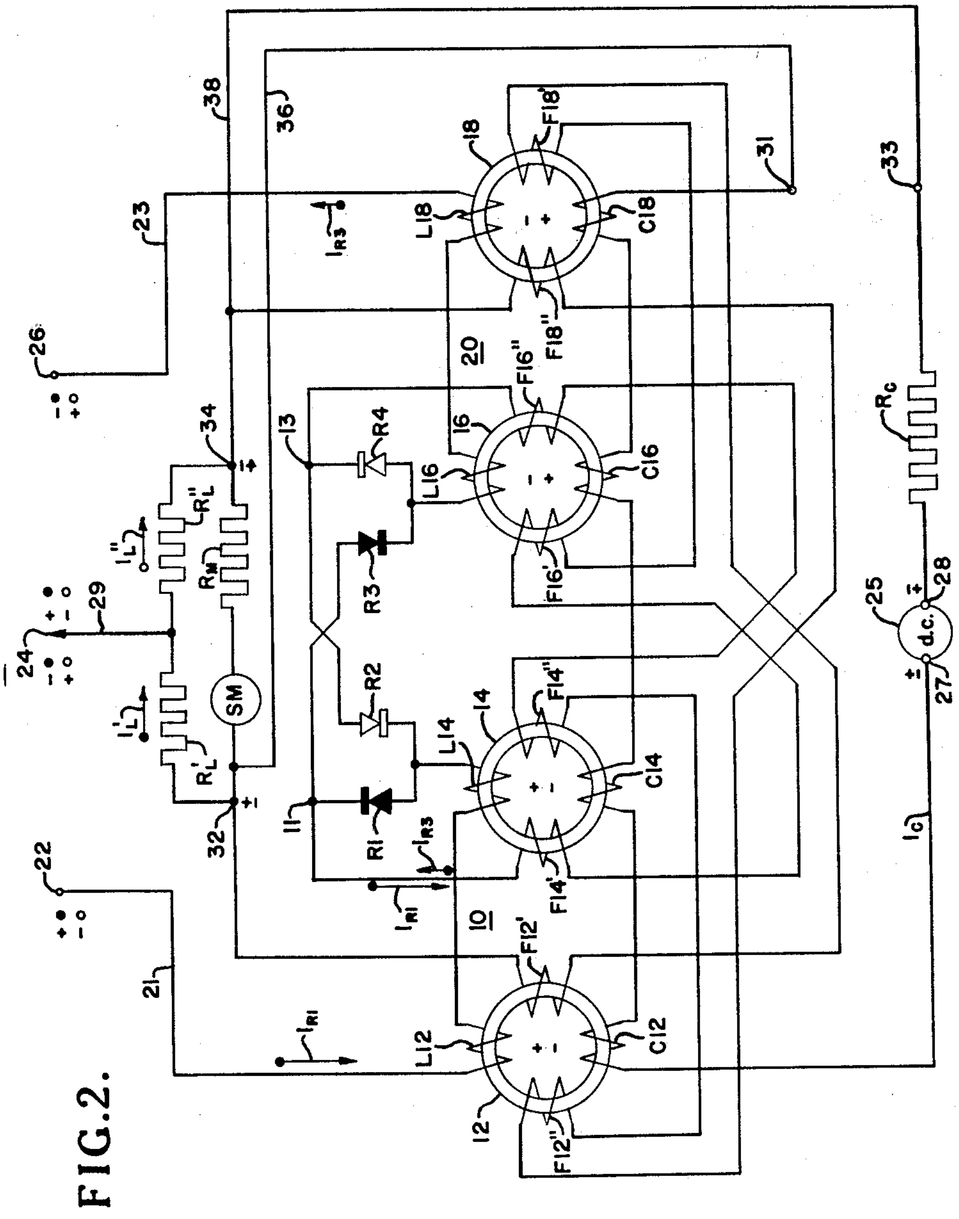
Fig. 2 is a modification of Fig. 1 and employs differential feedback windings and self-balancing circuitry.

In order to adapt the circuit of Fig. 1 for servo applications, it is necessary to increase the power gain thereof. This is accomplished, in accordance with the present invention, by the provisions of differential feedback windings to increase the gain and self-balancing feedback circuitry to counteract the minor and insignificant instability introduced by the differential feedback windings, as illustrated in Fig. 2. The push-pull arrangement and polarity discriminating circuit of Fig. 2, with the exception of the differential and self-balancing feedback networks, are similar in circuitry to the push-pull and polarity discriminating arrangements of Fig. 1, like reference numerals designating similar elements and the graphical symbols indicating the same condition of operation. Although bias windings are omitted from Fig. 2 for the sake of simplicity, and clarity, it is to be understood that bias windings are to be connected in the circuit of Fig. 2 in the same manner as illustrated in Fig. 1.

The differential feedback network consists of two series branches individually conductive on opposite half-cycles of the A.C. operating potential source 15 (not shown in Fig. 2). One branch, operable on the positive half-cycles (black polarity), and connected across terminals 11 and 32, comprises serially-connected feedback windings F14′, F16′, F18′, and F12′ respectively wound on core reactors 14, 16, 18 and 12. The other feedback winding branch, operable on the negative half-cycles (white polarity), includes windings F16″, F14″, F12″ and F18″ connected in series across terminals 13 and 34.

During the positive half-cycles, current components $I_{R_1}$ and $I_{R_3}$ tend to flow in opposing directions through the feedback branch including windings F14′, F16′, F18′, and F12′, the actual current flow being the difference between these components, namely output current $I_L'$. The conductive path for current component $I_{R_1}$ may be traced from terminal 22 through load windings L12 and L14, rectifier R1, feedback windings F14′, F16′, F18′, and F12′ in the order named, and through auxiliary resistive load $R_L'$ to terminal 24; while the path for current component $I_{R_3}$ is from terminal 24 through load $R_L'$, feedback windings F12′, F18′, F16′ and F14′, rectifier R3, and load windings L16 and L18 to terminal 26. It is to be noted that the direction of flow of current components $I_{R_1}$ and $I_{R_3}$ are in opposition through the feedback windings F12′, F14′, F16′, and F18′; and, therefore, the actual current flowing through these windings is the difference current $I_L'$, as aforestated. Upon reversal of polarity of control signal current $I_C$, the magnitude of current component $I_{R_3}$ will exceed that of $I_{R_1}$; and, as a consequence, the direction of flow of actual output current $I_L'$ will be opposite to that shown in Fig. 2. Therefore, the polarity of half-wave output current pulse $I_L'$ is reversible and dependent upon the polarity of the control signal current $I_C$.

In a similar manner and during the negative half-cycles of the A.C. operating source, the conductive paths of current components $I_{R_4}$ and $I_{R_2}$ may be traced, in opposing current-flow directions through feedback windings F12″, F14″, F16″ and F18″, from terminals 26 to 24 and 24 to 22, respectively, to produce useful output difference current $I_L''$ across auxiliary resistive load $R_L''$. The composite unidirectional full-wave output, derived from $I_L'$ and $I_L''$, is applied to an utilization device such, for example, as a servo-motor SM which is connected across output terminals 32—34 through series resistor RM.

Since the feedback effect produced during each half-cycle is proportional to the actual difference of the two current components occurring during the half-cycle ($I_{R_1}$ and $I_{R_3}$ during positive half-cycles; and $I_{R_2}$ and $I_{R_4}$ during negative half-cycles), this type of feedback has been referred to as "differential feedback method" in the magnetic amplifier art. The differential feedback windings produce, in windings C12—C18, additional D.C. magnetizations which are proportional to the load currents $I_L'$ and $I_L''$ and which provide positive feedback effects in the cores. The feedback windings are so disposed on the core that the two unidirectional reversible output currents $I_L'$ (first half-cycle current) and $I_L''$ (second half-cycle current) flow through the two separate systems of series-connected feedback windings in such a manner as to produce D.C. magnetizations which aid the D.C. magnetizations produced by the control windings C12—C18, thereby enhancing the power amplification of the magnetic amplifier circuit. For a more comprehensive description and understanding of positive differential feedback technique, reference is made to my U.S. Patent 2,338,423, issued January 4, 1944.

Although the differential feedback network improves the power amplification of the amplifier, it also introduces undesirable drift effects which cause instability of a minor nature, the instability being of such insignificance as to be practically disregardable for most applications. However, if stability of a high order is desired, the technique of negative electric feedback, as disclosed in my U.S. Patent Re. 24,068 which issued on Oct. 4, 1955, may be employed to overcome the minor adverse effects introduced by the differential feedback windings. To this end, negative electric feedback is derived from the current components appearing across auxiliary resistors $R_L'$ and $R_L''$ which are connected in closed series circuit relation with the control windings C12—C14 and C16—C18 through leads 36 and 38. The closed series circuit consists of control source 25, control windings C12 to C18, lead 36, auxiliary loads $R_L'$ and $R_L''$, lead 38, and current limiting resistor $R_C$. This circuit is effective to cause a polarity-reversible compensating current to flow through the control windings in a direction opposite to the direction of flow of control current $I_C$ whereby the effective control current flowing through the control windings is substantially zero, as is readily understood by those skilled in the art who are acquainted with the teachings of the aforementioned reissue patent. In this manner, the control circuit operates under current balance conditions in which the D.C. control signal $I_C$ exercises only a transient type of control, consequently resulting in nullification of asymmetry drifts introduced by the differential feedback windings.

Moreover, in addition to overcoming the introduced instability, the negative electric feedback circuit is also effective to improve the speed of response to such an extent that the circuit of Fig. 2 is characterized by a one-half cycle speed of response. Therefore, although the negative electric feedback circuit is optional in Fig. 2, it is desirable to incorporate this feature therein for the twofold purposes of counteracing instability and to increase the speed of response. In order to adapt the circuit of Fig. 2 for operation either with or without negative electric feedback, there is provided a pair of terminals 31 and 33 which may be bridged with a jumper for operation without negative feedback or which may be connected to terminals 32 and 34, respectively, by leads 36 and 38, as illustrated, for operation with negative feedback.

In summarizing the circuit of Fig. 2, it is seen that the invention provides a bias-excitation type of push-pull amplifier characterized by a novel output coupling circuit which is operationally augmented by positive differential magnetic feedback in conjunction with negative electric feedback. This circuit is admirably suited for applications in D.C. instrumentation and servo mechanism systems operating from a D.C. control source.

Figure 3:
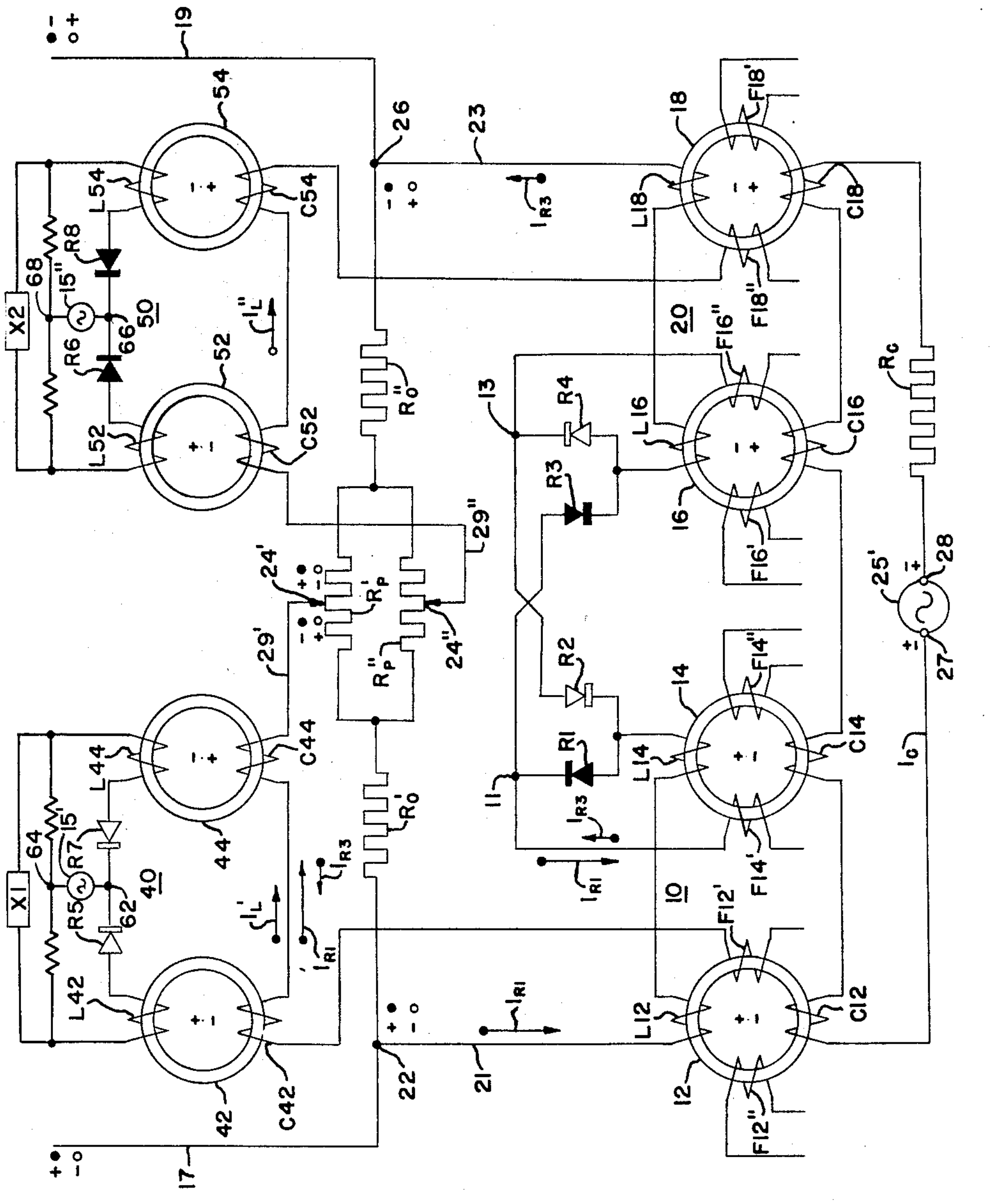
Fig. 3 is a schematic diagram of an A.C. controlled multi-stage push-pull magnetic amplifier arrangement utilizing the novel bias-excitation magnetic amplifier circuit of the present invention as the input stage for a pair of independently operating half-wave self-saturating output stages.

Referring now to Fig. 3, which illustrates an A.C. application of the present invention, there is shown a schematic wiring diagram of a multi-stage push-pull magnetic amplifier arrangement utilizing the novel bias-excitation magnetic amplifier of the present invention as the input stage for a pair of independently operating conventional half-wave push-pull self-saturating output stages indicated generally as 40 and 50. In order to adapt push-pull sections 10 and 20 for an A.C. input control signal from source 25′, control windings C12 to C18 are connected in series aiding relation.

The circuit of Fig. 3 utilizes control windings C42—C44 and C52—C54 in lieu of the auxiliary resistors $R_L'$ and $R_L''$, respectively, of Fig. 1; and, additionally, Fig. 3 employs positive differential feedback windings as discussed for Fig. 2. Two potentiometer resistors $R_P'$ and $R_P''$ are provided so that both half-cycle components may be separately adjusted under zero signal conditions. Otherwise, the bias-excitation push-pull circuit of Fig. 3 is the same in construction and operation as Fig. 1, like reference numerals designating similar elements and the graphical symbols indicating the same conditions of operation.

Half-wave stage 40 includes a pair of reactors 42 and 44 with series-opposing control windings C42 and C44 respectively wound thereon to differentially vary the flux level in accordance with output current $I_L'$ flowing therethrough, and load windings L42 and L44 simultaneously energized through rectifiers R5 and R7 on alternate half-cycles of A.C. source 15′ to supply half-wave current pulses to a load X1. Half-wave stage 50 is constructed similar to stage 40 and is responsive to output current $I_L''$ to drive load X2 with half-wave current pulses. The A.C. sources 15′ and 15″ are merely by way of illustration to simplify the presentation thereof and in actuality are only symbolic representations of A.C. source 15 (not shown but connected as in Fig. 1), which is connected to the input bias-excitation stage and the output stages 40 and 50 in such a manner that stage 40 is non-conductive during the conductive half-cycles of rectifiers R1 and R3, and stage 50 is non-conductive during the conductive half-cycles of rectifiers R2 and R4. This is accomplished by connecting terminals 62 and 66 to lead 17 and terminals 64 and 68 to lead 19. In this manner, the output current $I_L'$ flows through control windings C42 and C44 during the non-conductive half-cycle of stage 40 to preset the flux level therein whereby the reactors of stage 40 fire on the next half-cycle when rectifiers R5 and R7 conduct, as is conventional in half-wave self-saturating magnetic amplifiers. Stage 50 operates in the same manner but is 180 degrees out of phase with stage 40 so as to be responsive to output current $I_L''$.

Figure 4:
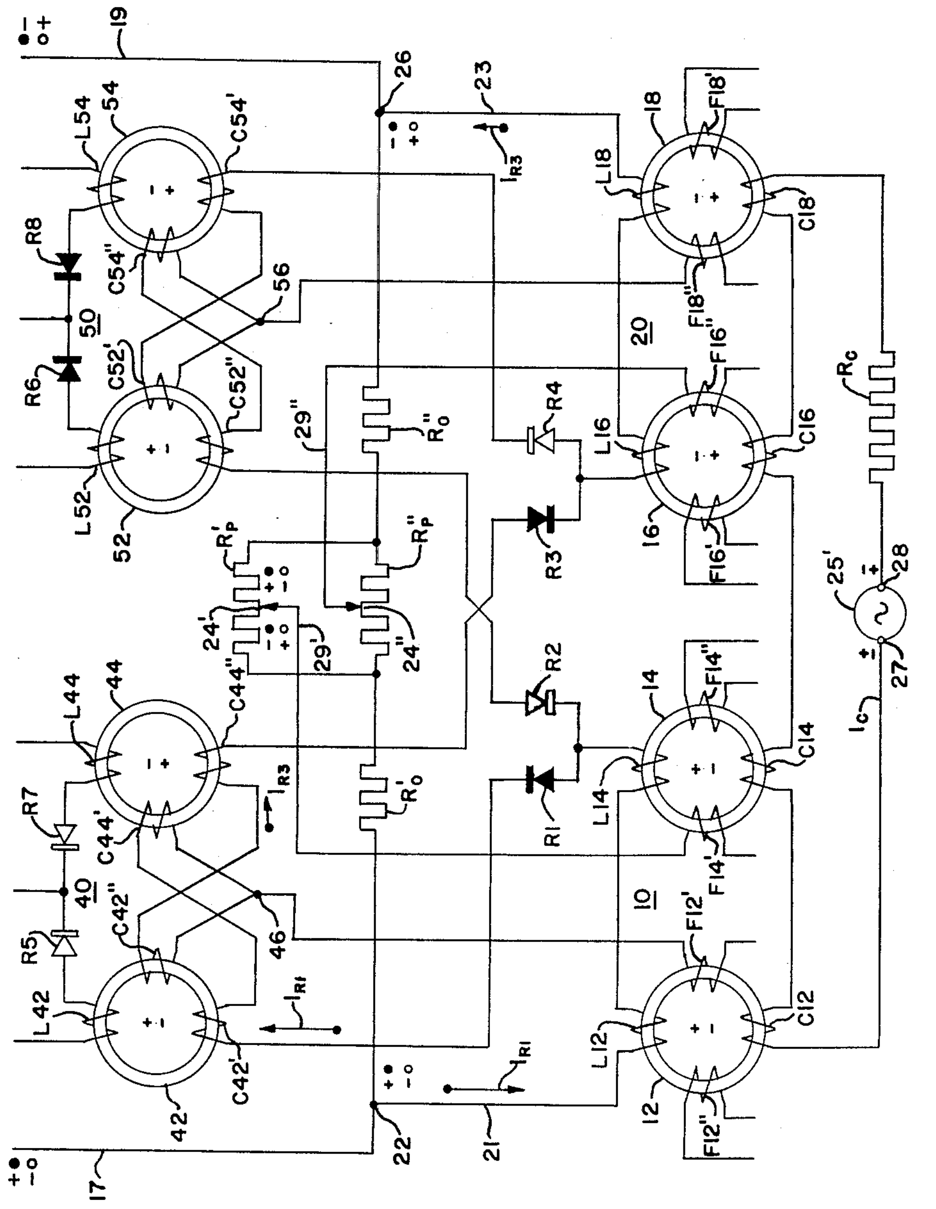
Fig. 4 is a modification of Fig. 3 utilizing differentially wound control windings in the output stages.
Figure 5C:
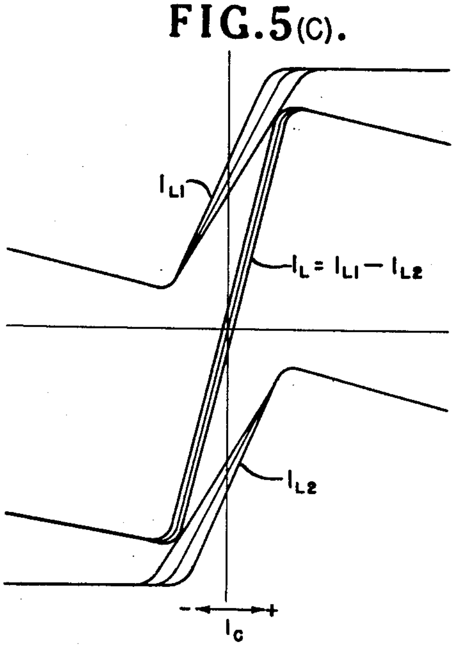
Figure 5A:
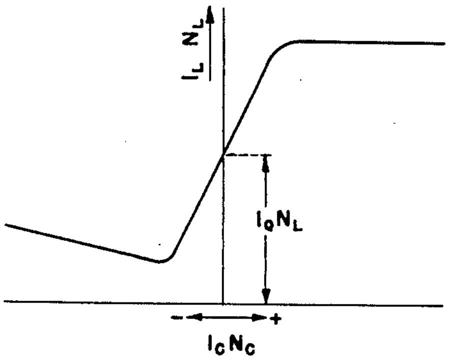
Figure 5D:
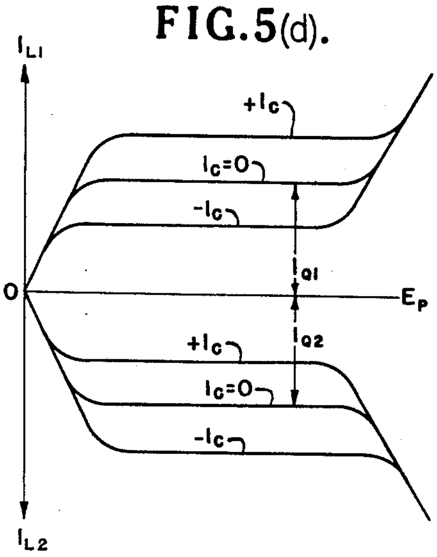
Figure 5B:
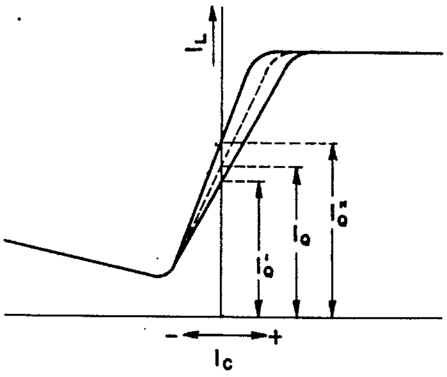

Fig. 4 is a modification of Fig. 3 utilizing the technique of differentially wound control windings in the output stages, such technique being fully disclosed in my U.S. Patent 2,725,521. With the exception of the differential control windings, the circuit of Fig. 4 is identical to Fig. 3 in construction and conditions of operation, like reference characters designating corresponding components. Control windings C42′ and C42″ are equally rated and wound on core 42 to differentially vary the flux level therein, the control windings of cores 44, 52 and 54 being similarly wound.

In operation and during the black polarity half-cycles, current component $I_{R_1}$ flows through control windings C42′ and C44′ and current component $I_{R_3}$ flows through control windings C42″ and C44″. Under control signal conditions, these current components product D.C. magnetizations proportional to the difference current $I_L'$ in cores 42 and 44. However, under zero control signal conditions, components $I_{R_1}$ and $I_{R_3}$ will be of the same magnitude and generate equal and opposite D.C. magnetizations which cancel each other, thereby resulting in the elimination of quiescent current interference which may influence the load windings of stages 40 and 50. Although not shown, it is to be understood that the bias-excitation push-pull input stage of Figs. 3 and 4 include bias windings connected as shown in Fig. 1.

In summary, the invention provides a novel output coupling circuit for a bias-excitation type of magnetic amplifier, the novel output circuit being characterized by the advantage of minimizing the factors which contribute to inherent drift errors in the amplifier. Also, it is apparent that the invention provides new and improved full-wave push-pull magnetic amplifier arrangements of the bias-excitation type. It is additionally apparent that the invention provides the novel combination of bias-excitation magnetic amplifier circuit with self-saturating magnetic amplifier circuit, which combination is made feasible by the novel output coupling circuits.

Obviously, many modifications of the present invention are possible in the light of the above teachings. It is therefore to be understood, that within the scope of the teachings herein and the appended claims, the invention may be practiced otherwise than as specifically described.

What is claimed and desired to be secured by Letters Patent of the United States is:

1. An output circuit for a bias-excitation type of push-pull magnetic amplifier stage having a pair of opposing reactor controlled sections with each section including a pair of load windings operatively energized from an A.C. power supply source; said output circuit including a first and second load impedance means; a first pair of similarly poled rectifiers serially connecting all of said load windings across the A.C. power supply source and phased to pass current on alternate half-cycles of said source in one direction through said load windings to produce a first half-wave output signal of a polarity and amplitude determined by the reactor controlled sections; said first load impedance means being connected to be supplied with said first half-wave output signal; and a second pair of similarly poled rectifiers serially connecting all of said load windings across the A.C. source and phased to pass current on the other alternate half-cycles of said source through said load windings in a direction opposite to said one direction to produce a second half-wave output signal of a polarity and amplitude determined by the reactor controlled sections; said second load impedance means being connected to be supplied with said second half-wave output signal.

2. The circuit of claim 1, further including an utilization device connected to be responsive to the composite output current of said first and second output signals.

3. The circuit of claim 2, further including full-wave bias windings in said reactor controlled sections and connected to be energized from said power supply source to establish reference flux level in said sections.

4. The circuit of claim 2, further including a first positive feedback winding network in said reactor controlled sections and connected to conduct said first half-wave output signal therethrough to supply positive magnetic feedback to said sections on the alternate half-cycles during which said first pair of rectifiers pass current, and a second positive feedback winding network in said reactor controlled sections and connected to conduct said second half-wave output signal therethrough to supply positive magnetic feedback to said sections on the alternate half-cycles during which said second pair of rectifiers pass current, whereby said sections are supplied with full-wave positive magnetic feedback.

5. The circuit of claim 4, wherein said reactor controlled sections are controlled by a phase-reversible D.C. control signal source; and further includes circuit connections for connecting said control signal source in series circuit relation with said utilization device so as to feedback said composite output current and derive therefrom negative electric feedback.

6. The circuit of claim 4, wherein said reactor controlled sections are controlled by an amplitude modulated A.C. control signal source.

7. The circuit of claim 6, wherein said utilization device is comprised of a pair of half-wave self-saturating magnetic amplifiers; each of said amplifiers including a pair of reactors with control and load windings on each of the reactors; and wherein said first load impedance means is formed by the control windings of one of said amplifiers, and the second load impedance means is formed by the control windings of the other of said amplifiers.

8. The circuit of claim 7, wherein the control windings of each of said self-saturating amplifiers comprise a pair of windings differentially wound on each reactor, the pair of windings on each of the two reactors of said one amplifier being interconnected to form two series branches for receiving said first half-wave output signal as the control signal for said one amplifier, and the pair of windings on each of the two reactors of said other amplifier being interconnected to form two series branches for receiving said second half-wave output signal as the control signal for said other amplifier, whereby said self-saturating amplifiers operate to independently drive a respective half-wave load circuit.

9. A differential load circuit for a full-wave push-pull magnetic amplifier having a pair of reactor controlled sections with each section including a pair of load windings thereon operatively energized from an A.C. power source: said load circuit comprising, in combination, terminal means connectable to said power source; a first pair of series branch circuits connected to said terminal means including a pair of similarly poled rectifiers one of which is disposed in each branch circuit and connecting all of said load windings in each section across said power supply, said branch circuits being conductive during alternate half-cycles of said source of predetermined polarity; a first load means connected across said pair of branch circuits; one of said branch circuits including one of said rectifiers and a pair of load windings of one of said sections and being operative to pass current in one direction through said first load means; the other of said branch circuits including the other of said rectifiers and a pair of load windings of the other of said sections and being operative to pass current through said first load means in a direction opposite to said one direction, whereby the output current appearing across said first load means is the difference between the currents flowing through said pair of branch circuits; a second pair of series branch circuits connected to said terminal means and including a second pair of similarly poled rectifiers in each of said second branch circuits, and connecting all of said load windings in each section across said power supply, each branch circuit being conductive during the half-cycles opposite in polarity to said predetermined polarity of said source; a second load means connected across said second pair of branch circuits; one of said second branch circuits including one of the said second pair of rectifiers and a pair of load windings of said one reactor section and being operative to pass current in one direction through said second load means; the other of said second pair of branch circuits including the other of said second pair of rectifiers and a pair of load windings of said other reactor section and being operative to pass current through said second load means in a direction opposite to said one direction, whereby the output current appearing across said second load means is the difference between the currents flowing through said second pair of branch circuits.

10. The circuit of claim 9, wherein said first load means are the control windings of a first self-saturating magnetic amplifier, and wherein said second load means are the control windings of a second self-saturating magnetic amplifier, said first and second magnetic amplifiers being operatively independent.

11. An output coupling circuit for a push-pull magnetic amplifier stage of the bias excitation type having a plurality of cores of saturable magnetic material, said coupling circuit comprising, in combination, a pair of terminals connectable to an A.C. power source, a load winding on each of said cores, a pair of series branch circuits connected in parallel across said terminals, one of said branch circuits including a first pair of similarly poled rectifiers serially connecting all of said load windings across the A.C. power supply and phased to pass alternate half-cycles of predetermined polarity to produce half-wave output current, the other of said branch circuits including a second pair of similarly poled rectifiers serially connecting all of said load windings across the A.C. power supply and phased to pass alternate half-cycles of a polarity opposite to said predetermined polarity to produce half-wave output current, a first load impedance means connected to receive the output current produced by said one branch circuit, and a second load impedance connected to receive the output current produced by said other branch circuit.

12. The circuit of claim 11, wherein said first and second load impedance means comprise respectively first and second self-saturable magnetic amplifiers.

13. The circuit of claim 12, wherein said push-pull magnetic amplifier stage is controlled by an amplitude modulated A.C. control signal source.

14. The circuit of claim 11, wherein said first and second load means are connected in tandem, and further including a galvanometer-movement instrument connected across the tandem arrangement of said first and second load means to thereby be responsive to the composite of the output currents appearing in said first and second load means.

15. In a bias-excitation type of push-pull magnetic amplifier operated from an A.C. source, the combination of four half wave rectifier elements, a first half-cycle splitting circuit operable during alternate half-cycles of said source and including a first pair of said rectifier elements connected to said source so as to derive a first pair of half-cycle pulses during each operable half-cycle of said splitting circuit, a second half-cycle splitting circuit operable during the other alternate half-cycles of said source and including the other pair of said rectifier elements connected to said source so as to derive a second pair of half-cycle pulses during each operable half-cycle of said second splitting circuit, reactance means connected in common to said first and second half-cycle splitting circuits, first and second load elements connected in operative circuit relationship with said first and second half-cycle splittling circuits in such a manner that the first load element carries the difference of said first pair of half-cycle pulses and the second load element carries the difference of said second pair of half-cycle pulses, and external feedback means comprising a pair of differential feedback winding circuits each connected in conductive relation with a respective one of said half-cycle splitting circuits.

16. The combination of claim 15 further including second stage reactor means wherein each of said load elements are connected as a pair of control windings therefor.

17. The circuit combination of claim 16 wherein each of the control windings comprise a pair of differentially connected elements, two pairs of said differentially connected elements being connected in circuit relation with said first half-cycle splitting circuit, and the other two pairs of said differentially connected elements being connected in circuit relation with said second half-cycle splitting circuit.

References Cited in the file of this patent

UNITED STATES PATENTS

| | | |
|---|---|---|
| 2,700,130 | Geyger | Jan. 18, 1955 |
| 2,704,823 | Storm | Mar. 22, 1955 |
| 2,795,652 | Malick et al. | June 11, 1957 |
| 2,831,159 | Guth | Apr. 15, 1958 |

OTHER REFERENCES

"Magnetic Amplifiers of the Balance Detector Type—Their Basic Principles, Characteristics and Application," by W. A. Geyger, AIEE Transactions, vol. 70, 1951, Figs. 31 and 33.